3,203,169
IRRADIATED POLYMERS AND PROPULSION PROCESS
Gaetano F. D'Alelio, South Bend, Ind., assignor to Dal Mon Research Co., Cleveland, Ohio, a corporation of Delaware
No Drawing. Filed Apr. 24, 1958, Ser. No. 730,531
28 Claims. (Cl. 60—35.4)

This invention relates to irradiated, crosslinked paraffin compositions. More specifically, it relates to such compositions adapted for use as a solid propellant fuel.

In the propelling of rockets and related devices, it is highly desirable that the fuel supplying the propellant force should be a solid fuel. The use of liquid or gaseous fuels requires containers generally capable of withstanding considerable pressures, as well as devices for feeding the fuel, all of which add considerable weight to the rocket. Moreover, with the fuel in a liquid state, there is considerable sloshing in the container which causes shifting of weight and endangers directional control of the rocket. With solid fuels, however, the containing and feeding devices can be dispensed with or be simplified considerably and sloshing is avoided. In fact, the fuel can be used as its own container and as an insulating shield for the combustion zone.

The use of thermoplastic hydrocarbon resins for such purposes has the disadvantage that the portion of the resin in proximity to the flame or combustion zone is melted and either drips away or is blown away by the combustion gases. This results in a considerable loss of the B.t.u. value of the fuel.

It has been proposed to use thermoplastic rubber to give the fuel its desired shape and then, after the desired modifiers have been added, the rubber is vulcanized to remove the thermoplastic properties. However, vulcanization requires undesirable conditions, such as increased temperature, and the addition of undesirable vulcanizing agents. Moreover with such rubber compositions, there is undesirable channeling during the combustion.

In accordance with the present invention, it has now been found that a solid propellant fuel can advantageously be made of paraffin containing a crosslinking modifier, with or without other modifiers, which is irradiated to produce crosslinking of the paraffin and thereby impart non-dripping, non-melting properties to the fuel. The fuel is advantageously made in the form of a solid rod or elongated cylinder with an opening running along the axis of the rod in such a manner that an oxidizing agent or resulting combustion gases can be passed through the opening so that the rod is burned from the inside surfaces. The fuel composition preferably contains oxidizing agents of a solid or liquid type which will either sustain the combustion itself, or at least will supplement the oxidizing action of the material being passed through the rod. Such materials as ammonium perchlorate, potassium perchlorate, ammonium nitrate, etc., can be used for this purpose.

The paraffin is sometimes referred to herein as fuel base material, or base material.

In addition to the crosslinking modifiers, oxidizing agents, etc., the paraffin can also contain, in a minor amount, various polymeric materials, such as polymeric hydrocarbons, such as polymeric olefins, i.e. polyethylene, polystyrene, etc., polymeric oxygenated hydrocarbons, such as polymeric esters, polymeric ethers, polyalkenyl acetals, etc., thermoplastic rubber, etc., which will also be crosslinked upon irradiation. The crosslinking modifier facilitates and increases the crosslinking effected in the paraffin which might otherwise be degraded by irradiation. Moreover, the amount of crosslinking modifier and type thereof can reduce the amount of irradiation required to produce the desired effects, and temperature increases can thereby be more easily avoided or controlled.

Paraffin from different sources can be used in the practice of this invention, namely, for example, from petroleum, lignite, brown coal, and synthetic sources. Petroleum waxes generally have melting points between 50° C. and 60° C. and contain hydrocarbons essentially in the range of $C_{23}$ to $C_{35}$, or higher. Minor amounts of lower molecular weight and higher molecular weight materials are found in such compositions. Synthetic paraffin and paraffin from other sources have been found to contain hydrocarbons as high as $C_{57}$, for example, from wax of certain crude oils. Some of these have melting points as high as 80° C., or higher. Lignite paraffin has melting points ranging from about 35° C. to 62° C., those melting below 50° C. being known as soft paraffin, and those melting above 50° C. being referred to as hard paraffin. Paraffin from these various sources can be used in the practice of this invention.

The use of a crosslinking modifier in these materials facilitates and increases molecular crosslinking. Thus, the cross linking desired in the material can be produced with very much less irradiation than without the crosslinking modifier and very often cannot be produced without the modifier even with considerably more irradiation. Moreover, temperature increases can thereby be more easily avoided or controlled.

The use of irradiation in the presence of crosslinking modifier to produce the crosslinked character of these compositions and resultant infusibility therein, permits lower temperatures in the manufacturing process and avoids adverse effects on the various oxidizing agents which may be incorporated in the fuel. Since the crosslinking effected thereby does not require high temperatures, this invention permits the incorporation of high proportions of oxidizing agents that are unstable at temperatures normally used to effect crosslinking. Moreover, the material can be precooled and periodically recooled during preparation without adversely affecting the crosslinking operation. Moreover, the product of this invention when used as a rocket fuel does not result in channeling and serves as a good insulation shield for the combustion zone.

While other types can also be used, the crosslinking modifiers used in the practice of this invention advantageously can be polyalkenyl aryl compounds, i.e. divinyl benzene, diallyl naphthalene, diisopropenyl diphenyl, etc., polyunsaturated esters, ethers, mixed ether-esters, derivatives of alkenyl aryl hydrocarbons, etc., such as the diacrylate of hexamethylene glycol, the divinyl ester of adipic acid, the diallyl ester of azelaic acid, the vinyl ester of 11-acryloxy-undecylic acid, etc.

It is generally desirable that the fuel be molded in the shape in which it is ultimately to be used before the composition is irradiated. In fact, the fuel can be cast or molded as one entire unit which will comprise the entire fuel load for one rocket and can be substantially as long as the rocket if desired. Therefore, the size is limited only by the size of the rocket in which it is to be used.

It is possible to make the fuel in other shapes than indicated above and have the irradiated fuel machined to give the desired shape. For example, cylindrical shapes are generally desirable with an opening running through the cylinder along its linear axis. If desired there can be a plurality of such openings running through the length of the mass so that more than one oxidizing stream can function simultaneously. However, various other shapes can be used, such as blocks having rectangular or square cross sections with one or more openings running along the linear axis of the block.

While the aforementioned shapes are preferred, it is also possible to use smaller units or shapes made by the practice of this invention, and then to assemble them in a space or container in such a manner that one or more open linear paths are left through the assembled mass so that the oxidizing gas and/or the combustion gases can be passed therethrough. For example, the fuel can be in the shape of discs with an opening in the center, or in half or quarter discs, or even with rectangular, square, or various other cross-sections so that upon assembly, one or more openings for the oxidizing gas are formed through the assembled mass. Sometimes to accommodate the irradiation equipment a cylindrical mass can be made of a number of concentric cylinders for which the outer diameter of one is slightly less than the diameter of the inside linear opening of another so that the assembled cylindrical mass actually comprises a number of cylindrical sleeves which fit over one another. The axial opening of the one having the smallest diameter would be the linear axis opening of the assembled mass.

In any case, however, the desired modifiers are added before irradiation. For example, the auxiliary oxidizing agents, such as the ammonium and potassium perchlorates and nitrates, should be added before irradiation. These are desirably in fine particle size so as to permit substantially uniform distribution throughout the mass. The oxidizing composition which is to be passed through the center opening is of the type generally used presently, such as pure or highly concentrated oxygen. The upper limit in the amount of oxidizing agent to be used is determined by the concentration that can safely be used under the conditions ultimately existing in the fuel zone of the rocket, or by that excess over the stoichiometric amount required for complete combustion of the fuel, whichever limit is reached first. Obviously, the safety limit will vary according to the type of auxiliary oxidizing agent used, the type of fuel base material used together with its heat capacity and heat transmission properties, the temperature which will exist in the preparation and use of the fuel, etc.

Since the fuel composition of this invention can be used according to various methods, varying from that in which the entire amount of oxidizing agent is supplied from the fluid pumped through the linear opening to that in which the combustion is self-sustined by the oxidizing compound contained in the fuel, the minimum amount of such oxidizing agent contained in the fuel will depend on the manner in which the fuel is to be used. When the combustion is to be maintained partly by an oxidizing agent in the fuel and partly by the oxidizing agent pumped through the opening, then obviously the supplemental effect of one agent toward the other will depend on the particular material being used as the oxidizing agent in the fuel and on the particular oxidizing fluid being fed through the opening.

Moreover, in each case the relative amounts cannot be determined on a weight basis but must be determined on the basis of the amount of oxygen available in the particular oxidizing agent used to support the combustion. This depends on the oxygen content of the oxidizing agent and the percent of that oxygen that is liberated for oxidizing purposes upon decomposition of the oxidizing agent. Furthermore, this depends somewhat on the efficiency with which it is desired to consume the fuel. For example, it might be desirable to have a considerable excess of oxidizing agent so as to consume the fuel more completely, even though it might mean an inefficient use of the oxidizing agent. Again, if it is permissible to use the fuel with a low efficiency for use of B.t.u. content, then it may be desirable to use a smaller amount of oxidizing agent.

The amount of oxidizing agent imbedded in the fuel itself can be further decreased when a supplemental oxidizing fluid is being pumped through the linear opening. Obviously, therefore, the proportion of oxidizing agent imbedded in the fuel base material can vary from zero to approximately 95 percent depending on the various factors involved, such as the efficiency desired, the method and convenience of operation, and the materials being used. Generally, when an oxidizing agent is imbedded in the base material, it is advantageous to use from 1 percent, preferably about 5 percent, to about 75 percent based on the combined weight of oxidizing agent, base material, and any crosslinking modifier that is used.

When an oxidizing agent is used in the fuel base material of the type and in the amount that will be self-sustaining in the combustion of the fuel base material, there will be no need to flow an oxidizing fluid through the opening of the fuel. In such cases, the combustion of the fuel is initiated by igniting with various compositions as are presently used for that purpose, such as a mixture of hydrazine, or unsymmetrical dimethyl hydrazine and nitric acid, or by triethyl aluminum and oxygen, or by a torch, or by an electrical ignition system. When an oxidizing agent is not present in the fuel, or is not of the self-sustaining type, liquid oxygen or an efficient oxidizing compound such as perchloryl fluoride ($FClO_3$) can be pumped into the opening to supply the oxygen for combustion. In some cases highly concentrated hydrogen peroxide, such as 98 percent hydrogen peroxide can be used to supply oxygen for combustion.

When a self-sustaining oxidizing agent is distributed throughout the fuel, the desirable amount can be determined by calculating the stoichiometric equivalent required for combustion of the fuel, and adjusting the calculation by subtracting where less than 100 percent efficiency is satisfactory or adding where desired, an excess to compensate for the lack of 100 percent efficiency in the actual combustion. Since the conditions of operation do not permit the time and type of mixing which give 100 percent efficiency, where other factors permit it is sometimes desirable to have an excess of oxidizing agent which will give 50 percent, or even as high as 100 percent more than the stoichiometric amount of oxygen. When it is permissible or desirable to sacrifice some of the efficiency of the B.t.u. content of the fuel, the stoichiometric amount or even less than the amount of the oxidizing agent can be used, depending on the fuel efficiency desired.

The auxiliary oxidizing agent and/or modifier can be introduced or suspended in the solid fuel in any convenient or appropriate manner. The mixture can be effected mechanically as on mixing mills, on a Banbury mixer, any single or double worm extruder, or by rotation of the mold when the material is being cast from a liquid state. When a solid is to be added, the thermoplastic material can desirably be softened by the addition of a softening agent or, as indicated above, by the modifier itself. Such compounded mixtures can then be extruded, or otherwise shaped into the desired form, and then irradiated. However, whichever method of mixing is used, it is desirable to avoid the generation of heat that will raise the temperature to the ignition point of the oxidizing agent. Therefore, in some cases it is desirable to precool the materials to be mixed or to provide means to withdraw the heat as it is generated.

Other oxidizing agents which can be incorporated in accordance with safety conditions determined by their reactivity are solid and liquid perchloryl aryl compounds of the formula Ar-$ClO_3$, such as perchloryl benzene, etc., ammonium persulfate, potassium permanganate, manganese dioxide, potassium iodate, potassium nitrate, potassium dichromate, chloric acid, perchloric acid, etc. Some of these are not self-sustaining oxidizing agents, and can be used when free oxygen, or compositions such as perchloryl fluoride, highly concentrated hydrogen peroxide, etc., which generate oxygen in situ, are passed through the linear opening. The liquid oxidizing agents can be incorporated with precautions to assure uniform distribution through the polymer mass and to avoid ignition or explosive conditions during preparation and use of the fuel.

The term "irradiation," as used herein, means high energy radiation and/or the secondary energies resulting from conversion of this electron energy to neutron or gamma radiation, said electron energies being at least about 100,000 electron volts. While various types of irradiation are suitable for this purpose, such as X-ray and gamma and beta rays, the radiation produced by high power electron linear accelerators has been found to be very conveniently and economically applicable and to give very satisfactory results. However, regardless of the type of irradiation and the type of equipment used for its generation or application, the use thereof in the treatment of polymeric materials as described herein is contemplated as falling within the scope of this invention so long as it is produced by or from electron energy of at least about 100,000 electrons volts. While there is no upper limit to the electron energy that can be so applied advantageously, the effects desired in the practice of this invention can be accomplished without having to go above 50,000,000 electron volts. Generally, the higher the electron energy used, the greater is the depth of penetration into the massive structure of polymeric materials, and the shorter is the time of exposure required to accomplish the desired result. For other type of irradiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van de Graaff generators, betatrons, synchrotons, cyclotrons, etc. Neutron radiation can be produced by bombarding a selected light metal such as beryllium with positive particles of high energy. Particle radiations can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to radiations of this type, commonly called X-ray, an ionizing electromagnetic radiation suitable for the practice of this invention can be obtained by means of a nuclear reactor (pile) or by the use of natural or synthetic radioactive material, for example cobalt 60.

Various types of high power electron linear accelerators are commercially available, for example from Applied Radiation Corporation, Walnut Creek, California. In the following Example I, Arco type travelling wave accelerator, model Mark I, operating at 3 to 10 million electron volts, was used to supply the irradiation. Other type of accelerators, such as supplied by High Voltage Engineering Corporation, Burlington, Massachusetts, or as described in United States Patent No. 2,763,609 and in British Patent No. 762,953 are satisfactory for the practice of this invention.

In the following examples, the radiation doses are reported in megareps, which represent 1,000,000 reps. A "rep" is defined, according to "Reactor Shielding Design Manual," edited by Theodore Rockwell III and published by D. Van Nostrand Company, Inc., 1st edition, 1956, as that radiation dosage which produces energy absorption in human tissue equal to 93 ergs per gram of tissue.

In the practice of this invention, changes in properties of the materials can often be noted after treatment with even less than 1 megarep. However, it is generally advantageous to use doses of 2 megareps or more. The degree of change in properties is dependent somewhat on the dosage, greater changes being effected by increasing the dosage.

The material to be treated is often advantageously irradiated while in a container made of a material such as aluminum or glass which will not substantially interfere with the irradiation. It is advantageous also to use polymeric materials, such as polyethylene, nylons, i.e. 66 nylon, polycaprolactam, etc. It can also be wrapped in film or foil impervious to vapors and gases, such as aluminum foil, polyethylene film, etc., which will prevent substantially the escape of volatile materials. It is often advantageous to avoid oxidation or side reactions by the use of an inert atmosphere such as nitrogen. Moreover, it is advantageous to prevent the temperature from approaching that at which the material is unstable. This can be accomplished by cooling the material before irradiation, for example with Dry Ice, or by dissipating the heat generated during irradiation.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight. Unless indicated otherwise, the terms "polymers" and "polymeric" are intended to include "copolymers" and "copolymeric." Molecular weights given herein are Staudinger molecular weights.

*Example I*

Paraffin having a melting point of 60° C. is mixed on a Banbury mixer with 10 percent divinyl benzene, based on the combined weight of the paraffin and modifier, and then is molded in the form of a cylinder three feet long and six inches cross-sectional diameter. An opening of one inch diameter is drilled along the linear axis of the cylinder. The cylinder is wrapped in polyethylene film and then exposed to 50 megareps of irradiation with intermittent cooling to keep the temperature below the M.P. of the mixture and subsequently used satisfactorily in a rocket with liquid oxygen fed through the opening in the cylinder.

*Example II*

The procedure of Example I is repeated, using hexamethylene glycol diallyl ether instead of divinyl benzene, and using cobalt 60 as the irradiation source. The fuel operates satisfactorily as in Example I.

*Example III*

The procedure of Example I is repeated, using a mixture of 70 parts paraffin, 20 parts polystyrene, and 10 parts divinyl benzene. The product is wrapped in polyethylene film and irradiated, as in Example I, with a dosage of 30 megareps. The irradiated product is used satisfactorily in a rocket supplied with liquid oxygen through the opening in the cylinder.

*Example IV*

The procedure of Example I is repeated satisfactorily using a mixture of 60 parts paraffin, 25 parts of polyethylene, and 15 parts of diisopropenyl benzene, with X-ray irradiation dosage of 20 megareps, and using liquid perchloryl fluoride in place of the liquid oxygen.

Example V

The procedure of Example I is repeated using 70 parts paraffin, 15 parts polyvinylbenzoate, and 15 parts divinyl naphtalene, with irradiation dosage of 25 megareps supplied from a Van de Graaff generator. The product is used satisfactorily in a rocket using liquid oxygen pumped through the opening in the cylinder.

Example VI

The procedure of Example I is repeated using 80 parts paraffin, 10 parts polyvinyl acetal, and 10 parts divinyl diphenyl, with irradiation dosage of 30 megareps derived from bombarded beryllium. The product operates satisfactorily as in Example I.

Example VII

The procedure of Example I is repeated satisfactorily in which the diacrylate of hexamethylene glycol is used instead of divinyl benzene, with an irradiation dosage of 20 megareps.

Example VIII

Sixty five parts of paraffin of 60° C. melting point and 10 parts of divinyl benzene (containing 1 percent t-butyl catechol) are mixed on a Banbury mixer with 25 parts of ammonium perchlorate, care being taken that the temperature of the mixture does not rise above 35° C. The resultant mixture is shaped into a cylinder four feet long and five inches outside diameter with an opening one inch in diameter running along the linear axis of the cylinder. The cylinder is cooled to a temperature below 25° C., wrapped in polyethylene film, and then exposed to 50 megareps of irradiation as in Example I, the temperature being checked periodically and being allowed to cool whenever the temperature approaches 35° C. The irradiated product is inserted in a rocket adapted for that size cylinder and ignited with a mixture of hydrazine and nitric acid used for rocket ignitions, and operates successfully in a self-sustained combustion.

Example IX

The procedure of Example VII is repeated, except that the divinyl benzene is replaced by the divinyl ether of bisphenol containing 1 percent of t-butyl catechol. The irradiated product operates successfully in a rocket as in the preceding example.

Example X

The procedure of Example VIII is repeated with similar success using potassium perchlorate instead of the ammonium perchlorate.

Example XI

The procedure of Example VIII is repeated with similar success using 25 parts of perchloryl benzene instead of the ammonium perchlorate.

Example XII

The procedure of Example IX is repeated twice, using in one case 35 parts of paraffin, 5 parts of p-acryloxystyrene (containing 1 percent of t-butyl-catechol) and 65 parts of potassium perchlorate; and in the other case 25 parts of paraffin, 5 parts of the allyl ester of 11-acryloxyundecanoic acid (containing 1 percent of di-t-butyl-p-cresol) and 70 parts of ammonium perchlorate. In each case the product is irradiated as in Example I to a dosage of 35 megareps and is subsequently used successfully in rockets after ignition with a mixture of diallyl catechol and nitric acid as is sometimes used for that purpose.

Example XIII

Polyethylene film five feet wide is wound on a bar having a two inch diameter and a thin layer of a substantially uniform mixture of 25 parts of paraffin of 50° C. melting point, 5 parts of the commercial divinyl benzene mixture containing 50 percent divinyl benzene and 50 percent ethyl styrene, and 50 parts of ammonium perchlorate is spread evenly on the inner surface of the film as it is rolled on to the bar in such a manner that the mixture is trapped between successive layers of the film as it is wound. When the cylinder reaches a cross-sectional outside diameter of seven inches, the accumulated weight of ammonium perchlorate represents 50 percent of the combined weight of film and mixture. The cylinder is exposed to 30 megareps of irradiation as in Example I, while maintaining the temperature below 30° C. After irradiation, the bar is removed from the center of the cylinder and the irradiated roll used successfully in a rocket as in Example VIII.

Example XIV

The procedure of Example VIII is repeated except that 25 parts of the paraffin are replaced by 25 parts of polystyrene. After an irradiation dose of 30 megareps, as in Example I, the irradiated product operates successfully in a rocket according to the technique used in Example VIII.

Example XV

The procedure of Example VIII is repeated three times replacing 30 parts of the paraffin with 30 parts of polyethylene in each case. In the first case, 25 parts of potassium perchlorate are used, in the second case, 25 parts of ammonium perchlorate are used, and in the third case, 25 parts of perchloryl benzene. In each case an irradiation dose of 25 megareps is used as in Example I, and the irradiated product is subsequently used successfully in a rocket in accordance with the technique used in Example VIII.

Example XVI

The procedure of Example VIII is repeated satisfactorily three times by replacing 25 parts of the paraffin in the first case with 25 parts of polyallyl butyrate, in the second case with 25 parts of polyvinyl butyral, and in the third case with 25 parts of polyethyl acrylate.

Various crosslinking modifiers can be used in accordance with the practice of this invention, including compounds having one or more ethylenic or acetylenic groups therein. These serve to lower the energy level of irradiation required to produce the desired degree of crosslinking. The modifiers comprise organic compounds containing two unsaturated groups of the ethylenic or acetylenic type or derivatives thereof, which are connected through groups or linkages which are relatively stable to irradiation.

One type of preferred crosslinking modifier includes those having the formula:

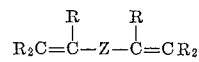

wherein Z is a divalent aromatic or aliphatic (including cycloaliphatic, unsaturated aliphatic, and heterocyclic groups containing in the ring structure, carbon, and a minor part of nitrogen and/or oxygen) groups and combinations thereof, in which groups there are at least two carbon atoms between said valencies; R is hydrogen, or an alkyl, aryl, chloro, fluoro, cyano, —COOR″, —CH$_2$COOR″, two R's can also represent a third bond between the two carbons, and R can also be joined with another R or Z to form a cycloaliphatic or heterocyclic ring containing a minor portion of nitrogen and/or oxygen, and R″ is hydrogen or a hydrocarbon group; preferably R is hydrogen, or two R's represent a third bond between the two carbons, or one R substituted with a lower alkyl group, such as methyl or ethyl. Z, R, and the R groups can have substituted thereon radicals which will not interfere with irradiation, such as hydrocarbon, chloro, fluoro, alkoxy, aryloxy, cycloalkoxy, alkaryloxy, aralkoxy, acyloxy, cyano, —COOR″, —CH$_2$COOR″, etc.

Typical compounds of the above formula include the following: dialkenyl aryl compounds, dialkenyl alkanes, dialkenyl cycloalkanes, dialkenyl derivatives of pyridine, piperidine, morpholine, furane, pyrimidine, piperazine, etc., alkenyl cycloalkenes, etc.

Another preferred type of modifier includes compounds having the formula A—Z—A' wherein A and A' can be identical or dissimilar groups selected from the formulas:

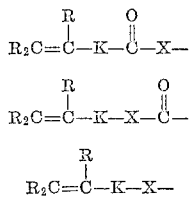

wherein K is any divalent aromatic or aliphatic group (including cycloaliphatic, unsaturated aliphatic, and heterocyclic groups containing in the ring structure, carbon, and a minor part of nitrogen and/or oxygen) and combinations thereof, and can also represent a single bond between the two adjacent atoms; X is oxygen or NR''; R'', Z and R are as defined above. Compounds of this formula include polyunsaturated polyesters, polyethers, ether-esters, polyamides, polyamines, amide-esters, amine-esters, ether-amides, ether-amines. Groups on Z, K, and R are as indicated above.

Other modifiers that can be used advantageously include those having the formulas:

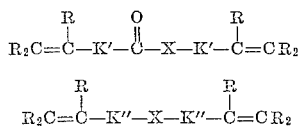

wherein R and X are as defined above, and K' and K'' are the same as defined above for K, but the sum of carbon atoms between said valencies in the two K's is at least 2, and the sum of carbon atoms between said valencies in the two K'''s is at least 3. Compounds fitting these formulas are polyunsaturated monoesters, monoethers, monoamides, and monoamines having 3 or more carbon atoms between the unsaturated groups.

Other modifiers, less desirable than those indicated above, can be used which have one of the following formulas:

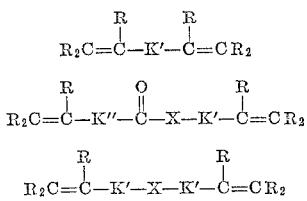

wherein R and X are as defined above; K' is as defined above, except that when it is a divalent radical, then both valencies are attached to the same carbon atom; and K'' is a single bond, or, when K' in the same compound is a single bond, then K'' can be a divalent radical having both valencies on the same carbon atom. Such compounds include butadiene-1,3 and its derivatives, pentadiene-1,4 and its derivatives, 1-vinyl-cyclohexene-1 and its derivatives, 1-vinyl-cyclohexane-2 and its derivatives, 4,4-divinyl piperidine, 1,1-divinyl-cyclohexane, furane, 3-allyl-furane, allyl acrylate, vinyl acrylate, isopropenyl methacrylate, isopropenyl chloracrylamide, vinyl methacrylamide, allyl acrylamide, vinyl acrylamide, vinyl crotonate, vinyl buten-3-oate, isopropenyl buten-3-oate, vinyl buten-3-amide, isopropenyl buten 3-amide, divinyl ether, diallyl ether, divinyl amine, diisopropenyl amine, vinyl allyl amine, diallyl amine, etc.

Polyalkenyl aryl compounds which can be used in the practice of this invention include: divinyl benzene, trivinyl benzene, divinyl naphthalene, trivinyl naphthalene, divinyl diphenyl, trivinyl diphenyl, divinyl toluene, trivinyl toluene, divinyl xylene, divinyl anisole, divinyl ethyl benzene, divinyl chlorobenzene, divinyl methylnaphthalene, divinyl ethylnaphthalene, divinyl methyldiphenyl, divinyl ethyldiphenyl, divinyl ethoxy naphthalene, divinyl chloronaphthalene, divinyl chlorodiphenyl, divinyl ethoxy diphenyl, vinyl isopropenyl benzene, vinyl isopropenyl naphthalene, vinyl isopropenyl diphenyl, vinyl isopropenyl toluene, vinyl isopropenyl anisole, vinyl isopropenyl chlorobenzene, vinyl isopropenyl methoxy naphthalene, vinyl isopropenyl chloronaphthalene, vinyl isopropenyl methyl chloronaphthalene, vinyl isopropenyl chlorodiphenyl, vinyl isopropenyl methoxy diphenyl, vinyl isobutenyl benzene, vinyl isobutenyl naphthalene, vinyl isobutenyl diphenyl, vinyl allyl benzene, vinyl allyl naphthalene, vinyl allyl diphenyl, vinyl allyl toluene, vinyl allyl anisole, vinyl allyl methylnaphthalene, vinyl allyl chlorodiphenyl, diallyl benzene, triallyl benzene, diallyl naphthalene, triallyl naphthalene, diallyl diphenyl, triallyl diphenyl, diallyl toluene, diallyl xylene, diallyl chlorobenzene, diisopropenyl benzene, diisopropenyl naphthalene, diisopropenyl diphenyl, diisopropenyl toluene, diisopropenyl anisode, diisopropenyl methyl naphthalene, diisopropenyl chlorodiphenyl, dimethallyl benzene, dimethallyl naphthalene, dimethallyl diphenyl, bis-(alpha-ethyl-ethenyl)-benzene, bis(alpha - ethyl-ethenyl)-naphthalene, bis - (alpha - ethyl - ethenyl) - diphenyl, bis - (alpha -vinyl-ethyl)-benzene, bis-(alpha-vinyl-ethyl)-naphthalene, bis-(alpha-vinyl-ethyl)-diphenyl, vinyl (alpha-vinyl-ethyl)-benzene, vinyl (alpha-vinyl-ethyl)-naphthalene, vinyl (alpha-vinyl-ethyl)-diphenyl, etc.

Other polyalkenyl aryl compounds that can be used include: dicrotyl benzene, dicrotyl naphthalene, dicrotyl diphenyl, dicrotyl anisole, dicrotyl xylene, bis-(4-vinyl-n-butyl)-benzene, bis-(5-isopropenyl-n-hexyl)-benzene, bis-(5-isopropenyl-n-hexyl)-diphenyl, bis-(5-methyl-hepten-5-yl)-benzene, bis-(5-methyl-nonene-6-yl)-diphenyl, bis-(n-decen-5-yl)-toluene, di-cyclopentenyl-naphthalene, divinyl carbazole, di-cyclohexenyl-benzene, etc.

Typical acetylenic hydrocarbons that can be used in the practice of this invention include: phenylene diacetylene, naphthylene diacetylene, ethylene diacetylene, cyclohexylene diacetylene, n-hexene-5-yl-acetylene, etc.

Typical polyalkenyl aliphatic compounds that can be used in the practice of this invention include: diallyl, 1,6-heptadiene, 1,8-nonadiene; 2,8-decadiene; 2,9-dimethyl-2,8-decadiene, divinyl cyclohexane, divinyl cyclopentane, divinyl methyl cyclohexane, diallyl cyclohexane, diallyl cyclopentane, dibutenyl cyclohexane, dipentenyl cyclohexane; 1-vinyl-cyclohexane-3; 1-allyl-cyclohexene-2; 1-allyl cyclohexene-3; diallyl cyclohexene, divinyl cyclohexene, divinyl piperidine, diallyl piperidine, diisopropenyl piperidine, divinyl pyridine, diallyl pyridine, diisopropenyl pyridine, dibutenyl pyridine; 3,5-divinyl morpholine; 2,5-divinyl piperazine; 1,4-divinyl piperazine, (beta-vinylalkyl)-furane, (beta-allyl-ethyl)-furane, 1,7-diphenyl-heptadiene-1,6, 2,7-diphenyl-octadiene-1,7, etc.

Various polyunsaturated polyesters suitable for the practice of this invention can be derived by forming the esters of acrylic acid and its various derivatives as indicated above with various polyhydroxy compounds of the formula:

HO—Z—OH with Z as defined above. The various acrylic derivatives are the alpha-methyl (methacrylic), alpha-chloro (chloracrylic), beta-methyl (crotonic), alpha-chloro-beta-methyl and alpha,beta-dimethyl derivatives. Examples of various polyhydroxy compounds from which the polyesters can be prepared are: ethylene glycol, trimethylene glycol, tetramethylene glycol, 2,3-dihydroxybutane, 1,4-dihydroxybutane, 1,4-dihydroxy-2-phenylbutane, 1,6-dihydroxy-hexane, 1,8-dihydroxy-octane, 2,11-dihydroxy-dodecane, 2,11-dimethyl-2,11-dihydroxy-dodecane, resorcinol, hydroquinone, catechol, dihydroxynaphthalene, trihydroxy benzene, trihydroxy naphthalene, dihydroxymethylnaphthalene, dihydroxy toluene, dimethylol benzene, di-(beta-ethylol)-benzene, di-(alpha-ethylol)-benzene, di-(beta-ethylol)-naphthalene, bisphenol or 2,2-di-(p-phenylol)-propane, beta-ethylol-phenol, beta-ethylol-naphthol, omega-hydroxy-n-octyl-phenyl, n-octyl-resorcinol, alpha-methyl-heptyl-resorcinol, sec-butyl-resorcinol, ethoxy-resorcinol, 1,8-dihydroxy-4-acetoxy-octane, phenoxy resorcinol, beta-phenylethoxy-hydroquinone, (ethylphenoxy)-catechol, acetoxy-dihydroxy naphthalene, 1,4-dihydroxy-cyclohexane, 1,4-dimethylol-cyclohexane, benzoxy-resorcinol, octoxy-bisphenol, 2,2-dimethyl-propanediol-1,3, 3-methyl-pentanediol-1,4, 2,2-diethylbutanediol-1,3, 4,5-dihydroxy-nonane, pentamethylene glycol, heptamethylene glycol, nonamethylene glycol, decamethylene glycol, glyceryl monoacetate, glyceryl monobenzoate, dihydroxy-vinyl-naphthalene, 2,11-dihydroxy-dodecene-5, 2,11-dihydroxy-6-vinyl-dodecane, 2,34-dihydroxy lycopene, dihydroxy-ethyl naphthalene, dihydroxy-ethoxy-naphthalene, dihydroxy-diphenyl, dihydroxy-phenethoxy-diphenyl, (ethylphenyl)-hydroquinone, (ethyl-phenoxy)-resorcinol, 2-phenoxy-propane-1,3-diol, beta-ethylol- hydroxy-diphenyl, gamma-hydroxy-propyl-phenol, 2-hydroxy-8-phenylolnonane, 2,8-dihydroxy-4-phenyl-nonane, etc. Except for practical limitations of availability there would be no upper limit to the number of carbon atoms between the hydroxy groups, particularly when Z is aliphatic since irradiation can also cause crosslinking through that part of the molecule, especially when Z includes aliphatic unsaturation such as in derivatives formed from 2,11-dihydroxy-dodecen-6; 2,11-dihydroxy-6-vinyl-dodecane, 2,34-dihydroxy-lycopene, vinyl-dihydroxy-naphthalene, etc.

Such polyunsaturated polyesters which can be used in the practice of this invention include the following as examples: ethylene glycol diacrylate and dimethacrylate, trimethylene glycol diacrylate, tetramethylene glycol dimethacrylate, pentamethylene glycol dicrotonate, hexamethylene glycol-di-(chloracrylate), diacrylate of 2,3-dihydroxybutane, dimethacrylate of 1,3-dihydroxy-butane, diacrylate of 1,6-dihydroxy-hexane (hexamethylene glycol), dimethacrylate of 1,8-dihydroxyoctane, di-chloracrylate of 2,11-dihydroxy-dodecane, diacrylate of decadimethyl-2,11-dihydroxy-dodecane, diacrylate of decamethylene glycol, diacrylate of glyceryl monoacetate, dimethacrylate of glyceryl monostearate, diacrylate of glycerine, diacrylate of dihydroxy-ethoxy naphthalene, diacrylate of (ethylphenyl)-hydroquinone, dimethacrylate of (ethylphenoxy)-resorcinol, diacrylate of di-(beta-ethylol)-benzene, diacrylate of omega-hydroxy-n-octyl-phenol, dicrotonate of dihydroxy-methylnaphthalene, di (chloracrylate) of dihydroxy-diphenyl, the acrylate-methacrylate mixed ester of dihydroxy-diphenyl, the crotonate-chloro-acrylate mixed ester of resorcinol, etc.

Polyunsaturated polyesters suitable for the practice of this invention can also be derived by forming the esters of unsaturated alcohols such as vinyl; isopropenyl; alpha-chloro-vinyl; allyl; methallyl; alpha-phenethyl-allyl; beta-chlorally; alpha-phenyl-alyl alcohols; 2-methylol-1,4-butadiene; 7 - hydroxy - octene-1; 7 - hydroxy - 2-methyl-octene-1; 2-hydroxy-2-methyl-octadiene-4,7; 3-hydroxy-3-methyl-butene-1; penten-1-ol-5; 2,5-dimethyl-5-hydroxy-hexene-1; 17-hydroxy-octadecene-1; 5-acetoxy-7-hydroxy-octene-1; 5-phenoxy-7-hydroxy-octene-1, etc. with polycarboxylic acids of the formula HOOC—Z—COOH, with Z defined as above.

Various polycarboxylic acids from which the polyunsaturated polyesters can be prepared include:phthalic, isophthalic, trimellitic, terephthalic, acetoxy-phthalic, phenoxy-phthalic, 3-vinyl-phthalic, 3-allyl-phthalic, phenethoxy terephthalic, naphthalene dicarboxylic, diphenyl dicarboxylic, butyroxy-naphthalene dicarboxylic, octyl-naphthalene dicarboxylic, nonyl-diphenyl dicarboxylic, sebacic, acetoxy-sebacic, azelaic, butoxy-azelaic, adipic, itaconic, glutaconic, decapentaene-10-dicarboxylic, pimelic, ethyl-phenyl-glutaric, benzoxy-glutaric, glutaric, octyl-succinic, phenyladipic, japanic (nonadecene-1,19-dicarboxylic acid), thapsic, malonic, methyl-succinic, hydroxy-succinic, brassilic, suberic acids, etc., and also including the condensation products of maleic anhydride with $C_{22}$ and similar olefins, and their hydrogenation products.

Typical polyunsaturated polyesters which can be used in the practice of this invention include the following: divinyl phthalate, diallyl phthalate, diallyl-acetoxy-phthalate, diisopropenyl phthalate, dimethallyl phthalate, diallyl butoxy phthalate, di-(alpha-chloro-vinyl) phthalate, di-(1-methyl-5-vinyl-pentyl) phthalate, diallyl terephthalate, divinyl terephthalate, triallyl-trimellitate, diisopropenyl naphthalene dicarboxylate, dimethallyl-diphenyl dicarboxylate, di-(alpha-chloro-vinyl) octyl-naphthalene dicarboxylate, diallyl succinate, divinyl succinate, diisopropenyl succinate, divinyl adipate, diallyl phenyl adipate, diisopropenyl butoxy - azelate, di-(beta-chlorallyl)- acetoxy-phthalate, dimethallyl phenoxy-naphthalene dicarboxylate, etc.

Polyunsaturated polyethers suitable for the practice of this invention can be derived by forming the ethers of unsaturated alcohols such as vinyl, isopropenyl, alpha-chloro-vinyl, allyl, methallyl, alpha-phenethyl-allyl, beta-chlorallyl, alpha-phenyl-allyl alcohols, 7-hydroxy-octene-1,7 - hydroxy-2-methyl - octene-1, 3-hydroxy-3-methyl-butene-1, penten-1-ol-5,2,5-dimethyl-5-hydroxy-hexene-1, 17-hydroxy - octadecene-1,5-acetoxy-7-hydroxy - octene-1, 5-phenoxy-7-hydroxy-octene-1, etc., with polyhydric compounds of the formula HO—Z—OH, with Z defined as above.

Examples of various polyhydric compounds from which the polyethers can be prepared are ethylene glycol,
trimethylene glycol,
2,3-dihydroxybutane,
1,4-dihydroxybutane,
1,3-dihydroxy-2-phenyl-butane,
1,6-dihydroxyhexane,
1,8-dihydroxy-octane,
2,11-dihydroxy-dodecane,
2,11-dimethyl-2,11-dihydroxy-dodecane,
2,2-dimethyl-propanediol-1,3,
3-methylpentanediol-1,4,
2,2-diethylbutanediol-1,4
4,5-dihydroxy-nonane,
pentamethylene glycol,
heptamethylene glycol,
nonamethylene glycol,
decamethylene glycol,
glyceryl monoacetate,
glyceryl monobenzoate,
resorcinol,
hydroquinone,
catechol,
dihydroxymethylnaphthalene,
dihydroxy-vinyl-naphthalene,
2,11-dihydroxy-dodecane-6,
2,11-dihydroxy-6-vinyl-dodecane,
2,3,4-dihydroxylcopene,
dihydroxy-ethyl naphthalene,
dihydroxy-ethoxy-naphthalene,
dihydroxy-diphenyl,
dihydroxy-phenethoxy-diphenyl,
(ethylphenyl)-hydroquinone,
(ethylphenoxy)-resorcinol,
2-phenoxy-propane-1,3-diol,
beta-ethylol-hydroxy-diphenyl,
gamma-hydroxy-propyl-phenol,
2-hydroxy-8-phenylol-nonane,
2,8-dihydroxy-4-phenyl-nonane,
dihydroxy-toluene,
dimethylol benzene,
di-(beta-ethylol)-benzene, di-(alpha-ethylol)-benzene,
di-(beta-ethylol)-naphthalene,
bisphenol or 2,2-di-(p-phenylol)-propane,
beta-ethylol-phenol,
beta-ethylol-naphthol,
omega-hydroxy-n-octyl-phenol,
n-octyl-resorcinol,
alpha-methyl-heptyl-resorcinol,
sec-butyl resorcinol,
ethoxy-resorcinol,
1,8-dihydroxy-4-acetoxy-octane,
phenoxy resorcinol,
beta-phenylethoxy-hydroquinone,
(ethylphenoxy)-catechol,
acetoxy-dihydroxy naphthalene,
benzoxy resorcinol,
octoxy-bisphenol, etc.

Except for practical limitations of availability, there is no upper limit to the number of carbon atoms between the hydroxy groups, particularly when Z is aliphatic since irradiation can cause crosslinking through that part of the molecule.

Polyunsaturated polyesters which can be used in the practice of this invention include the following as examples: the divinyl diethers of ethylene glycol, trimethylene glycol, pentamethylene glycol, hexamethylene glycol, 2,3-dihydroxybutane, 1,4-hydroxybutane, 1,4-dihydroxyphenyl-butane, resorcinol, di-(beta-ethylol)-benzene, etc., various diallyl diethers, such as the diallyl diether of ethylene glycol, trimethylene glycol, tetramethylene glycol, 2,3-dihydroxy-butane, resorcinol, beta-ethylol phenol, bisphenol, etc.; the diisopropenyl diethers of the aforementioned polyhydric compounds, such as the diisopropenyl diether of ethylene glycol, trimethylene glycol, tetramethylene glycol, 1,6-dihydroxy hexane, trihydroxy benzene, trimethylol benzene, etc.; dimethallyl diethers of ethylene glycol, trimethylene glycol, pentamethylene glycol, resorcinol, etc.; diethers of 2-methylol-butadiene-1,4, and of 2-hydroxy-2-methyl-octadiene-4,7 with dihydroxy naphthalene, dihydroxy toluene, beta - ethylol - phenol, ethoxy resorcinol, etc; the di-(alpha-chloro-vinyl diether of 1,8-dihydroxy-octane, the ethylene glycol diether of 7-hydroxy-2-methyl-octene-1, the diether of beta-ethylolphenol and 3-hydroxy-3-methyl-butene-1, the ethylene glycol diether of 17-hydroxy-octodecene-1, the decamethylene glycol diether of pentene-1-ol-5, the diether of gamma-hydroxy-propyl-phenol and 5-phenoxy-7-hydroxy-octene-1, the diether of alpha-phenethyl-allyl-alcohol and beta-ethylol-hydroxy-diphenyl, the diether of dihydroxyphenoxy-naphthalene and 5-phenoxy-7-hydroxy-octene-1, etc., as well as corresponding triethers such as trivinyl, triisopropenyl, triallyl triethers of 2,5,7-thrihydroxy-n-octone, trihydroxy-benzene, trimethylol benzene, trihydroxy naphthalene, etc., divinyl diethers of benzoxy-resorcinol, phenethyl-resorcinol, acetoxy-resorcinol, propyl-resorcinol, propoxy-resorcinol, etc., diallyl diethers of 1,3-dihydroxy-3-phenylbutane, 5-ethoxy-2,7-dihydroxy-n-octane, (beta-hydroxy-ethyl)-phenyl, phenol, etc.

Examples of other polyunsaturated polyesters that can be used include: tetramethylene bis-hexen-5-oate, trimethylene bis-octen-4-oate, hexamethylene bis-hepten-4-oate, tetramethylene glycol diester of the monomethyl ester of maleic acid, the ethylene glycol diester of the monoethyl ester of itaconic acid, the tetramethylene glycol diester of beta-cyanoacrylic acid, the hexamethylene glycol diester of cyclohexene-3-formic acid, the tetramethylene glycol diester of cyclopentene-3-formic acid, octen-4-yl 5-crotonoxy-caproate, decen-6-yl 11-(betacyano-acryloxy) - octadecanoate, hexen-3-yl 8-(p-butenyl-benzoxy)-octanoate, diallyl cyclohexylene diacetate, dibutenyl cyclohexylene-diformate, etc.

Examples of other polyunsaturated polyethers that can be used include: the ethylene glycol diether of 17-hydroxy-octadecene-8, the hexamethylene glycol diether of penten-3-ol-1, the hexamethylene glycol diether of 7-hydroxy-octene-4, the tetramethylene glycol diether of cyclohexene-3-ol, the ethylene glycol diether of cyclohexene-3-ethylol, the cyclohexene glycol diether of hexene-3-ol-1, bis(beta-n-octyloxy-ethyl)-cyclohexane, etc.

Various polyunsaturated polyamides suitable for the practice of this invention can be derived by forming the amides of acrylic acid and its various derivatives with various polyamino compounds of the formula:

RHN—Z—NHR with Z and R as defined above.

Typical polyunsaturated polyamides that can be used in the practice of this invention include the following as examples: ethylene diacrylamide and dimethacrylamide, trimethylene diacrylamide, tetramethylene dimethacrylamide, pentamethylene dicrotonamide, hexamethylene di-(chloracrylamide), diacrylamide of 2,3-diaminobutane, dimethacrylamide of 1,3-diaminobutane, diacrylamide of 1,6-diaminohexane, dimethylacrylamide of 1,8-diamino octane, di-chloroacrylamide of 2,11-diamino dodecane, dicrotonamide of 2,11-dimethyl-2,11-diamino dodecane, diacrylamide of decamethylene diamine, dimetharcrylamide of (phenyl diamine), diacrylamide of di-(beta-amino-ethyl)-benzene, dicrotonamide of diamino methyl naphthalene, di(chloracrylamide) of diamino-diphenyl, the acrylamide-methacrylamide mixed amide of diamino diphenyl, the crotonamide-acrylamide mixed amide of phenylene diamine, the ethylene diamide of hexen-3-oic acid, the tetraethylene diamide of octen-5-oic acid, the trimethylene diamide of the monomethyl amide maleic acid, the hexamethylene diamide of the monoethyl ester of itaconic acid, the hexamethylene diamide of beta-cyano-acrylic acid, etc.

Polyunsaturated polyamides suitable for the practice of this invention can also be derived by forming the amides of unsaturated amines with polycarboxylic acid of the formula HOOC—Z—COOH with Z defined as above. Typical suitable carboxylic acids of this formula are listed above for use in the preparation of polyesters.

Typical polyunsaturated polyamides of this type include the following: N,N'-divinyl phthalic diamide, N,N'-diallyl phthalic diamide, N,N'-diisopropenyl phthalic diamide, N,N'-dimethallyl phthalic diamide, N,N'-diallyl acetoxy-phthalic diamide, N,N'-di-(1-methyl-5-vinyl-pentyl) phthalic diamide, N,N'-diallyl terephthalic diamide, N,N'-divinyl terephthalic diamide, N,N',N''-triallylmellitic triamide, N,N'-diisopropenyl naphthalene dicarboxylamide, N,N' - methallyl-diphenyl-dicarboxylamide, N,N'-diallyl succinic diamide, N,N'-divinyl succinic diamide, N,N'-diisopropenyl succinic diamide, N,N'-divinyl adipic diamide, N,N'-diallyl phenyl adipic diamide, N,N'-diisopropenyl butoxy-azelaic diamide, N,N'-di-(beta-chlorallyl)-phthalic diamide, N,N'-di-hexen-3-yl itaconic diamide, N,N'-di-octen-5-maleic diamide, N,N'-dicrotyl azelaic diamide, N,N'-dicrotyl naphthalene dicarboxylamide, N,N'-dioctenyl adipic diamide, N,N'-dipropargyl azelaic diamide, N,N'-dipropargyl phthalic diamide, N-allyl 5-acrylamido-caproamide, N-butenyl 11-methacrylamido-undecanamide, N-hexen-3-yl 9-hexenoxy-nonamide, etc.

Typical polyunsaturated polyamines that can be used in the practice of this invention include the following as examples: 1,4-bis(vinylamino)-butane, hexamethylene bis(vinylamine), 1,8 - bis-(allylamine)-octane, 1,9-di-(isopropenylamino) - decane, bis(vinylamino)-benzene, bis(allylamino) - diphenyl, bis(isopropenylamino)-naphthalene, bis-(N-methyl-isopropenylamino)-benzene, 1,4 - bis-(beta-cyclohexene-3-ethyl-amino)-butane, 1,6-bis-(n-hexen-3-yl-amino)-hexene, etc.

Typical polyunsaturated ester-amides, ether amides, ester-amines, amino-amides, and ether-amines that can be used in the practice of this invention include as typical examples: pentamethylene monoacrylate monoacrylamide, hexamethylene monomethacrylate monomethyacrylamide, trimethylene monoacrylate monomethacrylamide, (para-acryloxy-phenyl) acrylamide, the dimethylamide of the mono-hexene-4-yl ester of itaconic acid, etc., the N-vinyl amide of the monovinyl ester of phthalic acid, the monoallyl amide-monoallyl ester of succinic acid, the hexen-4-yl monoester allyl monoamide of azelaic acid, the allyl ester of 5-acrylamido caproic acid, the isopropenyl ester of 11-methacrylamido undecanoic acid, cyclo-hexen-3-yl ester of 5-beta-cyano acrylamido-caproic acid, the vinyl ether of ethylene monoacrylamine, the allyl ether of trimethylene monomethacrylamide, the methallyl ether of tetramethylene monochloracrylamide, the chlorallyl ether of pentamethylene monocrotonamide, the alpha-phenyl-allyl ether of monoacrylamide of 2,11-dimethyl-2-hydroxy-11-amino-dodecane, N-allyl 5-allyloxy caproamide, N-isopropenyl 11-(hexen-4-oxy)-octadecanamide, N - vinyl(p-vinylphenoxy)-benzamide, 4-vinyl(4-allyloxy-cycloxy)-formamide, 1-acryloxy-9-allylamino-nonane, p-(hexen-3-yl-amine)-phenyl methacrylate, (4-allylamino-cyclohexyl), crotonate, methallyl 11-methallylamino-undecanoate, isopropenyl 5-isopropenyl-amino-caproate, vinyl 9-(hexen-3-yl-amino)-nonate, N-(4-allylamino-butyl)acrylamide, N-(6-isopropenylamino-hexyl) methacrylamide, N - (p-butenylamino-phenyl) crotonamide, N-(4-vinylamino-cyclohexyl) hexen-4-amide, N-allyl 5-allylamino-caproamide, N-cyclohexenyl 11-cyclohexenylamino-undecanamide, 1 - vinyloxy - 9-vinylamino-nonane, 2 - allyloxy-10-allylamino-undecane, 1-hexenyloxy-4-hexenylamino-cyclohexane, etc.

Typical polyunsaturated monoanimides and monoamines of the above formulas, suitable for the practice of this invention, include N-(p-vinyl-phenyl)acrylamide,
N-(o-vinyl-phenyl)methacrylamide,
N-(m-vinyl-phenyl)chloracrylamide,
N-(p-vinyl-phenyl)crotonate,
N-(p-isopropenyl-phenyl)acrylamide,
N-(o-isopropenyl-phenyl)-methacrylamide,
N-(m-isopropenyl-phenyl)chloracrylamide,
N-(p-isopropenyl-phenyl)crotonamide,
N-(p-allyl-phenyl)acrylamide,
N-(p-allyl-phenyl)crotonamide,
N-allyl para-(4-vinyl-1-methyl-n-butyl)-phenyl acrylamide,
N-allyl para-(4-vinyl-1-methyl-n-butyl)-benzamine,
N-(n-hexene-3-yl)hexene-3-amide,
para-isopropenyl-para'-(isopropenyl-amino)-diphenyl,
the allyl amine of para-(6-isopropenyl-1-methyl-n-hexyl)-diphenyl,
1-(allyl-amino)-7-isopropenyl-heptane,
1-(isopropenyl-amino)-6-isopropenyl-hexane,
1-(vinyl-amino)-8-vinyl octane,
bis-(4-vinyl-cyclohexyl)-amine,
bis-(4-isopropenyl-cyclohexyl)-amine,
N-(n-hexene-3-yl)-4-allyl-cyclohexyl-formamide,
4-allyl-cyclohexylcrotonamide,
diallyl-amine,
dimethallyl-amine,
di-hexene-3-yl-amine, etc.

Other examples of the polyunsaturated modifiers of the above formulas than can be used in the practice of this invention include: the vinyl ether of ethylene glycol monoacrylate; the allyl ether of trimethylene glycol monomethacrylate; the methallyl ether of tetramethylene glycol monochloracrylate; the chlorallyl ether of pentamethylene glycol monocrotonate; the mono(beta-methyl-chloracrylate) of the isopropenyl ether of 1,4-dihydroxy-2-phenyl-butane; the alpha-phenyl-allyl ether of the monoacrylate of 2,11-dimethyl-2,11-dihydroxy-dodecane; the monoacrylate monocrotonate of the glyceryl monoether of 7-hydroxy-octene-1; the isopropenyl-ether of the monoacrylate of 2,11-dihydroxy-dodecene-6; the monoether of 2-methylol-1,4-butadiene and the monomethacrylate of 2,11-dihydroxy-6-vinyl-dodecane; the monoether of 2-hydroxy-2-methyl-octadiene-4,7 and the monoacrylate of 2,34-dihydroxy-2,3,34,35-tetrahydrolycopene; the isopropenyl ether of the monochloracrylate of hexamethylene glycol; the mono-(alpha,beta-dimethyl-acrylate) of the 7-hydroxy-octene-1 ether of 1,8-dihydroxy-octane; the monoacrylate of the 3-hydroxy-3-methyl-butene-1 ether of resorcinol; the monomethacrylate of the ether of pentene-1-ol-5 and dihydroxynaphthalene; the monomethacrylate of the ether of 2,5-dimethyl-5-hydroxy-hexene-1 and dihydroxy-methyl-diphenyl; the monoacrylate of the ether of 17-hydroxy-octadene-1 and dihydroxy-acetoxy-naphthalene; the monocrotonate of the ether of 5-acetoxy-7-hydroxy-octene-1 and di-(beta ethylol)-benzene; the monoacrylate of the ether of 5-phenoxy-7-hydroxy-octene-1 and benzoxy resorcinol; the monoacrylate of the vinyl ether of beta-ethylol phenol; the monomethacrylate of the allyl ether of ethoxy resorcinol; the monoacrylate of the isopropenyl ether of phenoxy-hydroquinone; the monoacrylate of the isopropenyl ether of beta-phenylethoxy-hydroquinone; the monomethacrylate of the isopropenyl ether of 1-8-dihydroxy-4-acetoxy-dodecane; the monoacrylate of the vinyl ether of (ethylphenoxy)-dihydroxy-naphthalene; the monoacrylate of the diisopropenyl ether of trihydroxy-naphthalene; the monoacrylate, monochloracrylate of the allylether of 2,5,7-trihydroxyoctane, etc.

Such modifiers also include;

vinyl beta-acryloxy-butyrate;
methallyl epsilon-methacryloxy-caproate;
isopropenyl omega-chloroacryloxy-dodecanoate;
vinyl beta-acryloxy-propionate;
allyl 11-crotonoxy-hexadecanoate;
a-phenyl-allyl omega-acryloxy decanoate;
(1-methyl-5-vinyl-n-pentyl)p-acryloxy-benzoate;
(alpha,alpha-dimethyl-allyl) (beta-methyl-chloracryloxy)-ethoxy-benzoate;
(3-vinyl-n-propyl) p-acryloxyphenyl-acetate;
(1,1-dimethyl-3-isopropenyl-propyl-acryloxy-methoxy-benzoate;
(1-methyl-15-vinyl-n-pentadecyl) 2-acryloxy-2-phenyl-propionate;
(1-methyl-3-acetoxy-5-vinyl-n-pentyl) (alpha, beta-dimethyl-acryloxy)-naphthoate;
(1-methyl-3-phenoxy-5-vinyl-n-pentyl) (acryloxy-methoxy)-naphthoate;
isopropenyl 12-acryloxy-octaden-9-oate;
allyl-16-methacryloxy-hexadecen-7-oate;
2-methyl-octadiene-4,7-yl-2-chloracryloxy-(acetoxy-naphthoate);
methallyl-5-methacryloxy-8-benzoxy-nonoate;
chlorallyl crotonoxy-ethyl-naphthoate;
allyl methacryloxy-octoxy-benzoate;
α-phenyl-allyl-5-crotonoxy-nonoate;
vinyl-bis-(acryloxy-phenyl)-benzoate;
chlorallyl (acryloxy-phenoxy-ethyl)-benzoate;
vinyl-3-acryloxy-5-chloracryloxy-palmitate;
vinyl beta-vinyloxy propionate;
vinyl beta-allyloxy propionate;
vinyl beta-methallyloxy-butyroate;
allyl epsilon-allyloxy-caproate;
chlorallyl omega-isopropenyloxy-n-hexadecanoate;
alpha-phenyl-allyl 11-(1-methyl-5-vinyl-n-pentyloxy)-n-hexadecanoate;
1-methyl-5-vinyl-pentyl omega-(1-methyl-5-vinyl-n-pentyloxy)-n-decanoate;
alpha,alpha-dimethyl allyl (alpha-phenyl-allyloxy)-benzoate;
3-vinyl-n-propyl (3-vinyl-n-propyloxy-beta-ethoxy)-benzoate;
vinyl (1,3-dimenthyl-3-isopropenyl-n-propoxy-phenyl)-acetate;
1-methyl-15-vinyl-n-pentadecyl alpha-phenyl-beta-(1-methyl-3-acetoxy-5-vinyl-pentyloxy)-propionate;
isopropenyl (1-methyl-3-phenoxy-5-vinyl-pentyloxy)-naphthoate;

(1-methyl-n-heptadecyl) (vinyloxy-methyl)-naphthoate;
isopropenyl acetoxy-(1-methyl-5-vinyl-
   pentyloxy)-naphthoate;
(3-vinyl-n-propyl)ethyl-(1,2-dimethyl-
   allyloxy)-naphthoate;
methallyl octoxy-(allyloxy)-benzoate;
alpha-phenyl-allyl-5-vinyloxy-8-benzoxy-n-nonoate;
methallyl bis(vinyloxyphenyl)-benzoate;
vinyl ethyl-(vinyloxyphenyl)-benzoate;
vinyl 3,5-diallyloxy-palmitate;
vinyl beta, beta-bis-acryloxy-propionate;
divinyl acryloxy-succinate;
1-methyl-4,6-diallyloxy-heptyl acrylate;
vinyl bis-(isopropenyl-oxy-phenyl)-benzoate;
diallyl (beta-allyloxy-ethyl)-terephthalate, etc.

Other suitable polyunsaturated modifiers include:

vinyl-phenyl acrylate,
vinyl-phenyl methacrylate,
vinyl-phenyl chloracrylate,
vinyl-phenyl crotonate,
isopropenyl-phenyl acrylate,
isopropenyl-phenyl methacrylate,
isopropenyl-phenyl chloracrylate,
isopropenyl-phenyl crotonate,
allyl-phenyl acrylate,
allyl-phenyl methacrylate,
allyl-phenyl-chloracrylate,
allyl-phenyl crotonate,
allyl para-(4-vinyl-1-methyl-n-butyl)-phenyl-acrylate,
allyl para-(4-vinyl-1-methyl-n-butyl)-benzoate,
the allyl ether of para-(6-isopropenyl-1-methyl-n-
   hexyl)-phenol 2-vinyl-5-acryloxy-naphthalene,
2-isopropenyl-5-acryloxy-naphthalene,
1-vinyl-5-methacryloxy-napthalene,
2-isopropenyl-5-chloracryloxy-naphthalene,
2-allyl-5-methacryloxy-naphthalene,
1-acryloxy-6-(4-vinyl-1-methyl-n-butyl)-naphthalene,
para-vinyl-acryloxy-diphenyl,
para-isopropenyl-para'-methacryloxy-diphenyl,
para-allyl-para'-chloracryloxy-diphenyl,
the allyl ester of 5-(4-vinyl-1-methyl-n-
   butyl)-naphthoic acid,
the allyl ester of para-(6-isopropenyl-1-
   methyl-n-hexyl)-diphenyl-carboxylic acid,
6-isopropenyl-1-methyl-hexylacrylate,
8-vinyl-1-methyl-n-octylmethacrylate,
the isopropenyl ester of 6-vinyl-heptanoic acid,
the methallyl ester of 6-vinyl-octanoic acid,
the vinyl ester of 7-vinyl nonanoic acid,
the allyl ether of 7-isopropenyl-heptanol-1,
the isopropenyl ether of 6-isopropenyl-hexanol-1,
the vinyl ether of 8-vinyl-octanol-1,
1,8-diisopropenyl-n-octane,
1,6-diisopropenyl-n-hexane, etc.

The amount of polyunsaturated modifier to be added will vary depending on the properties of the base material to which it is added. For example, high molecular weight base materials would require less modifier to bring them to an infusible state, whereas a base material of lower molecular weight would require larger amounts of polyunsaturated modifier. Although even as little as 0.1 percent of polyunsaturated compounds often effects notable changes in the properties of the base material, it is generally advantageous to have at least 1 percent or more of such modifier present. The upper limit in the amount of such modifiers is determined by various factors, such as the effect on the B.t.u. value of the resultant product, etc. While even higher percentages of modifier, based on weight of the base material, might be desired in some cases where a softening effect is desired and where the effect on the B.t.u. value is not adverse or is permissible, as much as 50 percent, based on weight of base material, can be present. However, for practical and economical reasons, it is generally advantageous to add only sufficient modifier to effect infusibility in the base material or to effect such softening as may be desired.

While the desired amount of irradiation is not much more than the amount required to produce crosslinking or infusibility in the material being exposed, it is obviously desirable to avoid exposures of such great amount as to cause degradation or decomposition to such a degree that the product cannot be used for the purposes of this invention. While the upper limit will vary according to the material being treated, many of the base materials can safely be exposed to 100 megareps or more, while exposure of more sensitive materials should be below 80 megareps.

Other shapes and other uses of the fuel than those indicated above are contemplated. For example, solid rods or solid cylinders can be used with combustion being conducted on the outer surfaces. Particularly with the amount of oxidizing agent permitting more easily controlled combustion, the fuel can be used in jet planes and for many other purposes.

While certain features of this invention have been described in detail with respect to various embodiments thereof, it will, of course, be apparent that other modifications can be made within the spirit and scope of this invention and it is not intended to limit the invention to the exact details shown above, except insofar as they are defined in the following claims.

The invention claimed is:

1. A solid propellant fuel consisting essentially of an irradiated paraffin mass containing about 0.1–50 percent by weight of a polyunsaturated crosslinking modifier, based upon the combined weight of said paraffin and said modifier, and having a tubular shape with substantially uniform cross section throughout its length, said mass having been exposed to at least two and no more than 100 megareps of high-energy, ionizing radiation derived from an energy source equivalent to at least 100,000 electron volts, said polyunsaturated crosslinking modifier being selected from the class consisting of polyunsaturated compounds having one of the following formulas:

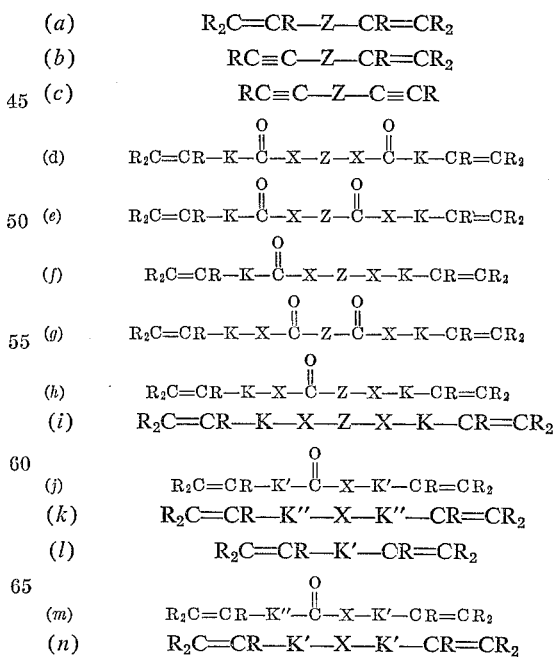

(a) $R_2C=CR-Z-CR=CR_2$ (b) $RC\equiv C-Z-CR=CR_2$ (c) $RC\equiv C-Z-C\equiv CR$ (d) $R_2C=CR-K-\overset{O}{\underset{\|}{C}}-X-Z-X-\overset{O}{\underset{\|}{C}}-K-CR=CR_2$ (e) $R_2C=CR-K-\overset{O}{\underset{\|}{C}}-X-Z-\overset{O}{\underset{\|}{C}}-X-K-CR=CR_2$ (f) $R_2C=CR-K-\overset{O}{\underset{\|}{C}}-X-Z-X-K-CR=CR_2$ (g) $R_2C=CR-K-X-\overset{O}{\underset{\|}{C}}-Z-\overset{O}{\underset{\|}{C}}-X-K-CR=CR_2$ (h) $R_2C=CR-K-X-\overset{O}{\underset{\|}{C}}-Z-X-K-CR=CR_2$ (i) $R_2C=CR-K-X-Z-X-K-CR=CR_2$ (j) $R_2C=CR-K'-\overset{O}{\underset{\|}{C}}-X-K'-CR=CR_2$ (k) $R_2C=CR-K''-X-K''-CR=CR_2$ (l) $R_2C=CR-K'-CR=CR_2$ (m) $R_2C=CR-K''-\overset{O}{\underset{\|}{C}}-X-K'-CR=CR_2$ (n) $R_2C=CR-K'-X-K'-CR=CR_2$ wherein Z is a divalent group having at least two carbon atoms between said valencies and being selected from the class consisting of divalent hydrocarbon, divalent pyridine, divalent piperidine, divalent morpholine, divalent furane, divalent pyrimidine, and divalent piperazine groups, and the hydrocarbon, chloro, fluoro, alkoxy, cycloalkoxy, alkaryloxy, aralkoxy, acyloxy, cyano, —COOR″ and —CH₂COOR″ derivatives thereof; K represents a symbol selected from the class consisting of Z and a single bond connecting the two atoms of the formula adjacent to and connected to K; X is selected from the class consisting of oxygen and NR₂″; K′ and K″ are the same as defined above for K, except that in Formula (g) the sum of the carbon atoms between the valencies in the two K″ is at least two, in the formula (k) the sum of the carbon atoms between the valencies in the two K‴'s is at least three, in Formulas (l), (m) and (n) when K′ and K″ represent a divalent radical, then both valencies are attached to the same carbon atom in said radical, and in Formula (m) only one of the symbols selected from the class consisting of K″ and K′ can represent a divalent radical; R″ represents a radical selected from the class consisting of hydrogen and hydrocarbon groups; and R represents a radical selected from the class consisting of hydrogen, hydrocarbon groups and the chloro, fluoro, alkoxy, aryloxy, cycloalkoxy, alkaryloxy, aralkoxy, acyloxy, cyano, —COOR″ and —CH₂COOR″ derivatives of hydrocarbon groups.

2. A solid propellant fuel consisting essentially of an irradiated paraffin mass containing about 0.1–50 percent by weight of a polyunsaturated crosslinking modifier, as recited in claim 1, based upon the combined weight of said paraffin and said modifier, and having an elongated shape with at least one opening extending linearly in said mass, said mass having been exposed to at least 2 and no more than 100 megareps of high-energy, ionizing radiation derived from an energy source equivalent to at least 100,000 electron volts.

3. A solid propellant fuel of claim 2, in which said mass contains at least one percent by weight of said crosslinking modifier.

4. A solid propellant fuel of claim 3, in which said paraffin also contains a minor amount of a polymeric material, based on the combined weight of said paraffin and said polymeric material, selected from a class consisting of polymeric olefins, polymeric esters, polymeric ethers, polyalkenyl acetals and thermoplastic rubber.

5. A solid propellant fuel of claim 4, in which said polymeric material is a polymeric ester.

6. A solid propellant fuel of claim 4, in which said polymeric material is a thermoplastic rubber.

7. A solid propellant fuel of claim 4, in which said polymeric material is a polymeric olefin.

8. A solid propellant fuel consisting essentially of an irradiated crosslinked paraffin containing 0.1–50 percent by weight of a polyunsaturated crosslinking modifier, as recited in claim 1, based upon the combined weight of said paraffin and said modifier, said mass containing an oxidizing agent selected from the class consisting of potassium perchlorate, potassium nitrate, potassium permanganate, potassium iodate, potassium dichromate, ammonium perchlorate, ammonium nitrate, ammonium persulfate, manganese dioxide, perchloric acid, chloric acid, and aryl perchloryl compounds distributed substantially uniformly throughout said mass, said paraffin-modifier mixture being present in an amount representing 5–99 percent by weight of the combined weight of said paraffin, said modifier and said oxidizing agent, said oxidizing agent being present in an amount representing 1–95 percent by weight of said combined weight, and said mass containing said oxidizing agent having been exposed to at least 2 and no more than 100 megareps of high-energy, ionizing radiation derived from an energy source equivalent to at least 100,000 electron volts.

9. A solid propellant fuel of claim 8, in which said paraffin contains a minor amount of a polymeric material, based upon the combined weight of said paraffin and said polymeric material, selected from a class consisting of polymeric olefins, polymeric esters, polymeric ethers, polyalkenyl acetals and thermoplastic rubber.

10. A solid propellant fuel of claim 9, in which said polymeric material is a polymeric olefin.

11. A solid propellant fuel of claim 9, in which said polymeric material is a polymeric ester.

12. A solid propellant fuel of claim 9, in which said polymeric material is a thermoplastic rubber.

13. A solid propellant fuel of claim 9, in which said polymeric material is a polymeric ethylene.

14. A solid propellant fuel of claim 9, in which said polymeric material is a polymeric styrene.

15. A solid propellant fuel of claim 8, in which said oxidizing agent is ammonium perchlorate.

16. A solid propellant fuel of claim 8, in which said oxidizing agent is potassium perchlorate.

17. A solid propellant fuel consisting essentially of an infusible paraffin containing 5–75% by weight of an oxidizing agent selected from the class consisting of potassium perchlorate, potassium nitrate, potassium permanganate iodate, potassium dichromate, ammonium perchlorate, ammonium nitrate, ammonium persulfate, manganese dioxide, perchloric acid, chloric acid, and aryl perchloryl compounds.

18. A solid propellant fuel consisting essentially of an infusible paraffin containing 5–75% by weight of potassium perchlorate.

19. A process of preparing a solid propellant fuel of claim 8, comprising the step of exposing said mass to at least 2 and no more than 100 megareps of high-energy, ionizing radiation derived from an energy source equivalent to at least 100,000 electron volts.

20. A process of claim 19, in which said composition contains at least 1% by weight of said polyunsaturated crosslinking modifier.

21. A solid propellant fuel of claim 8, in which said oxidizing agent is 1–95% by weight of the combined weight of said oxidizing agent, said modifier and said paraffin.

22. A solid propellant fuel of claim 21, in which said oxidizing agent is ammonium perchlorate.

23. A solid propellant fuel of claim 21, in which said oxidizing agent is potassium perchlorate.

24. A process of preparing a solid propellant fuel comprising the steps of shaping a mass consisting essentially of paraffin and about 0.1–50% by weight of a polyunsaturated modifier, as recited in claim 1 based upon the combined weight of said paraffin and said modifier, into a shape in which said fuel is ultimately to be used and thereafter exposing said shaped mass to at least 2 and no more than 100 megareps of high-energy, ionizing radiation derived from an energy source equivalent to at least 100,000 electron volts.

25. A process of claim 24, in which said mass contains at least 1% by weight of said polyunsaturated crosslinking modifier.

26. In a process of propelling a rocket by a rocket motor consisting essentially of a thrust chamber and exhaust nozzle, the step of combusting an irradiated crosslinked mass consisting essentially of paraffin and 0.1–50% by weight of a polyunsaturated crosslinking modifier, as recited in claim 1, based upon the combined weight of said paraffin and said modifier, said mass being contained in the fuel chamber of said rocket and having a tubular shape of substantially uniform cross section throughout its length, said tubular shape being adapted to permit the escape of combustion products from one end only of the linear opening therein, and said mass having been exposed to at least 2 megareps and no more than 100 megareps of high-energy, ionizing radiation derived from an energy source equivalent to at least 100,000 electron volts.

27. In a process of propelling a rocket by a rocket motor consisting essentially of a thrust chamber and exhaust nozzle, the step of combusting an irradiated crosslinked mass consisting essentially of paraffin and 0.1–50% by weight of a polyunsaturated crosslinking modifier, as rectified in claim 1, based upon the combined weight of said paraffin and said modifier, said mass being contained in the fuel chamber of a rocket and having an elongated shape with at least one opening extending linearly in said mass, said linear opening being adapted to permit the escape of combustion products from only one end thereof, and said mass having been exposed to at least 2 and no more than 100 megareps of high-energy, ionizing radiation derived from an energy source equivalent to at least 100,000 electron volts.

28. A process of claim 27, in which said mass contains at least 1% by weight of said polyunsaturated crosslinking modifier.

References Cited by the Examiner

UNITED STATES PATENTS

| | | | |
|---|---|---|---|
| 1,906,402 | 5/33 | Newton | 204—154 |
| 2,763,609 | 9/56 | Lewis et al. | 204—154 |
| 2,791,883 | 5/57 | Moore et al. | |
| 2,793,970 | 5/57 | Jeppson | 204—154 |
| 2,877,504 | 3/59 | Fox. | |

FOREIGN PATENTS

| | | |
|---|---|---|
| 665,262 | 1/52 | Great Britain. |
| 732,047 | 6/55 | Great Britain. |
| 742,933 | 1/56 | Great Britain. |

OTHER REFERENCES

Arendale: Ind. and Eng. Chem., vol. 48, No. 4, April 1956, pp. 725–6.

Atomics, vol. 7, No. 11, November 1956, pp. 397 and 398.

Blatz: Ind. and Eng. Chem., vol. 48, No. 4, April 1956, pp. 727–9.

Buchanan et al.: Ind. and Eng. Chem., vol. 48, No. 4, April 1956, pp. 730–1.

Chem. and Eng. News, vol. 33, No. 21, 1955, pp. 5091 and 5092.

Chem. and Eng. News, No. 34, vol. 46, November 1956, pp. 5504 and 5506.

Glossary of Ordnance Terms, June 1959, Ordnance Eng. Hdbk. Office, Duke Univ., Durham, N.C., p. 247, preliminary edition.

Moore et al.: Jet Propulsion, vol. 26, No. 11, November 1956, pp. 965–8.

Sun: Modern Plastics, vol. 32, No. 1, September 1954, pp. 141–4, 146, 148, 150, 229–33, 236–8.

Symposium on "Utilization of Radiation from Fission Products," Harwell A.E.R.E., C/R 1231, February 1953, pp. 24, 25, 64, 66, 111–124.

Zaerhringer: Solid Propellant Rockets, Second Stage, American Rocket Co., Box 1112, Wyandotte, Mich. (1958), page 154.

CARL D. QUARFORTH, *Primary Examiner.*

LEON D. ROSDOL, ROGER L. CAMPBELL,
*Examiners.*